June 17, 1969  C. R. COUCH  3,449,997
TIMBER TRUSS PLATE-FASTENER AND SYSTEM
Filed Aug. 7, 1967
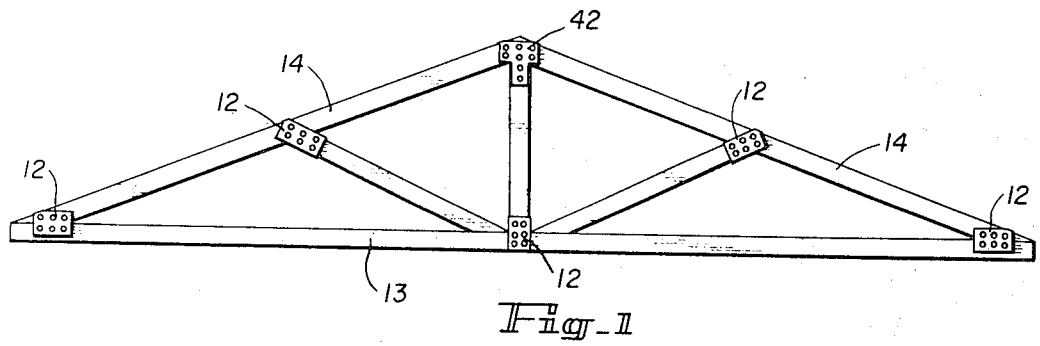
Fig_1
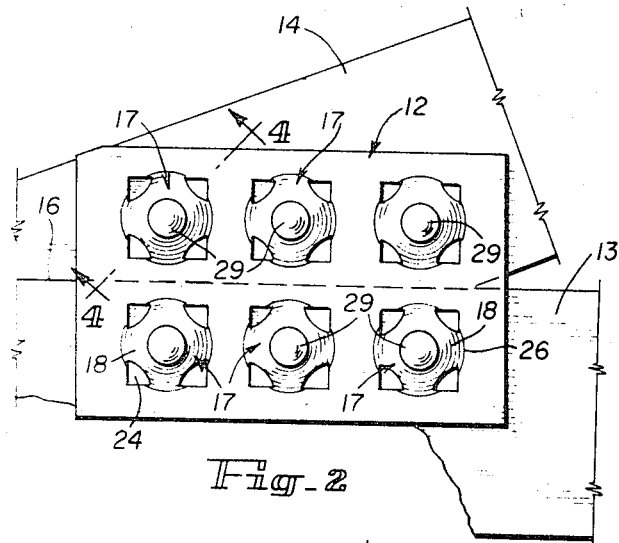
Fig_2
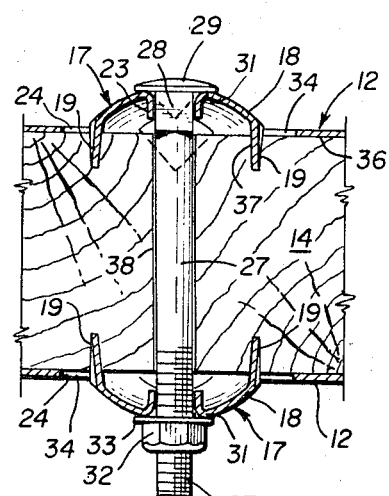
Fig_4
Fig_3
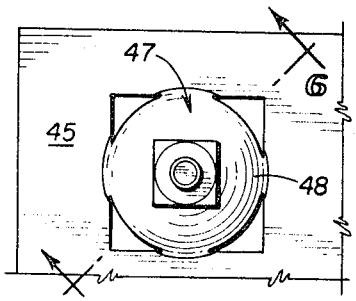
Fig_5
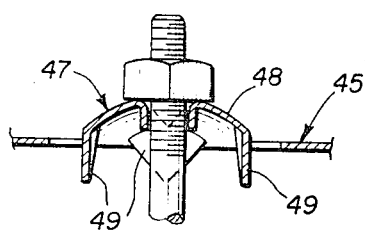
Fig_6
INVENTOR.
CLAUDE R. COUCH
BY
ATTORNEY //united States Patent Office 3,449,997
Patented June 17, 1969

3,449,997
TIMBER TRUSS PLATE-FASTENER AND SYSTEM
Claude R. Couch, 5025 W. 29th Ave.,
Denver, Colo. 80212
Filed Aug. 7, 1967, Ser. No. 658,773
Int. Cl. F16b 15/00, 7/00; E04c 3/02
U.S. Cl. 85—13                                       6 Claims

ABSTRACT OF THE DISCLOSURE

A truss plate-fastener combination for securely and efficiently holding timber construction elements in assembled relation for effective load transmission in which the plates provide formed turret sections of increased strength and rigidity adjacent fastener openings with timber engaging tines struck from the material of the plates adjacent said turret sections, and further utilizing fastener elements for extension completely through the timbers and plates for forcibly drawing the plates and tines into secure engaged positions and for holding said plates in place for the resistance of increased loadings.

BACKGROUND OF THE INVENTION

The general field of invention to which the present improvement is directed is concerned with the fabrication of timber structures and the coincident provision of improved fastener elements for holding components of a timber structure together. It is recognized that many previous inventions have been made to provide improved truss plates or gusset plates for joining timber elements together, and likewise many prior developments have been made in the general field of timber fasteners for the purpose of more efficiently joining mated timber elements together.

In part prior developments to which the present invention might be related have been established as separate fields of endeavor that are recognized as separate patent classifications. Where timber elements are to be joined together in lapped relation, ring elements or structures of special shape have been positioned between the timber elements and disposed about the truss fastener for more efficiently transmitting the loadings from the timber elements to the truss fastener and vice versa. The Timber Engineering Company of Washington, D.C., has been active in this field. This general field of invention is represented by Theodorsen Patent No. 2,100,415 and Myer Patent No. 2,283,943. A separate field of development has been concerned with the provision of truss plates that may be engaged with or pressed into butted timber elements to hold the elements in assembled relationship as necessary for the fabrication of trusses and similar elements of building construction. One type of truss plate in which the fastener components are struck from the plate itself is represented by an earlier patent granted to the present inventor, Couch Patent No. 3,225,643. A later invention presents a modified type of truss plate in which a separate formed fastener is engaged through a truss plate element and into but not through the timber structures (see Couch Patent No. 3,292,481).

The present invention is directed to the satisfaction of some objectives previously recognized in each of the described separate fields of invention.

SUMMARY OF THE INVENTION

The present invention provides a truss plate and fastener system that may be readily assembled in shops or under field conditions to provide a secure and reinforced joining of timber elements for construction purposes.

The combined structure of the truss plate elements provides wood gripping elements or tines for engagement with timber surfaces, a contoured reinforcing section and a formed opening conveniently sized and designed for the reception of standard through fastener elements. When used in pairs to provide truss reinforcement, the plates are applied to opposite sides of the timber elements, and the fasteners themselves may be used to pull the plates into secure engagement with the then joined wood members. The combination inclusive of the fastener, accordingly, obviates requirement for a hydraulic or mechanical press for the engagement of the truss plates, and the fasteners continue to serve a useful purpose in maintaining the plates and the tines thereon in secure engagement with the timber elements during periods of use. The formed sections in the truss plates include tine elements that are disposed to engage and compress the wood about the fastener opening in a manner similar to previous compression ring designs. The plates themselves and the punched out tines formed therein provide elements that duplicate the function of plates and formed tines in the previous truss plate configurations. The benefits of previously separate systems are, accordingly, presented in one combination that provides even additional benefits. The through fasteners will more effectively hold the plates and the tines thereof in engagement with the timbers to increase ultimate strength characteristics, and the plates, fasteners and truss elements may be disassembled for reuse.

BRIEF DESCRIPTION OF THE DRAWING

FIG. 1 presents a side elevation of a timber truss illustrating potential placement and use of the present invention, FIG. 2 is an enlarged plan view showing details of the plate and fastener combination of the present invention, FIG. 3 is an enlarged partial plan view of the plate shown in FIGS. 1 and 2 with the fastener removed therefrom, FIG. 4 is a side elevation in cross-section taken along the line 4—4 of FIG. 2 to illustrate further features of the invention, FIG. 5 is an enlarged partial plan view of a modified plate showing a separate embodiment of the invention and utilizing different fastener elements, and FIG. 6 is a cross-sectional elevation taken along the line 6—6 of FIG. 5 showing further details of such modified embodiment.

DESCRIPTION OF THE PREFERRED EMBODIMENTS

The features of a first embodiment of the invention are shown in FIGS. 1 through 4. In the fabrication of a timber truss 11 or other structural elements of buildings and structures, it has been widely recognized that truss plates 12 can be beneficially used at points where separate elements are to be joined together and where it is desirable that the rafters, cross braces, ceiling joists, etc. of a truss are to be disposed in planar relationship. Where truss plate reinforcing elements are used, improved strength and rigidity are obtained for the assembled trusses 11. Where trusses are being formed to carry larger loads, two or more timber pieces are used in side by side relationship and the cross braces or ceiling joists are often disposed in a plane between other elements of the truss. In this type of laminated construction compression rings or other fasteners are often used between lapped timber elements to efficiently transmit the inherent loads from the timber elements to the through fasteners that are used to hold the timber elements in their assembled relationship. In accordance with the practice in previous single plane truss construction where the pressed-in prongs of a punched truss plate or driven nails are inserted through a punched truss plate, the loads are transmitted from the timber elements to the truss plates by the formed prongs or by separate fasteners which are usually not extended through the timber elements themselves. Many truss plates for this type of use are applied by roll, hydraulic or stamping presses which drive the fasteners, prongs or tines into engagement with the timber elements. While the surface type truss plates with penetrating but non-piercing fasteners of various types have substantially improved the load carrying capacities of truss construction, it has been noted that failure of the truss or joint is generally preceded by withdrawal of the fasteners. When the fasteners are fully engaged, this type of nonpenetrating prong or fastener does provide a secure and efficient transmission of forces from the timber elements to the truss plates. To provide the combined advantages of surface truss plates and the compression ring type of timber accessory in a single system, the applicant provides a truss plate 12 that may have a general configuration as shown in FIG. 2.

When it is desired to join two timber elements together, such as the joist 13 and rafter 14, two separate plates are disposed on opposite sides of the timber elements to span the common joint 16. The plates are applied in position to assure the disposition of a plurality of fastener receptacles or turret sections 17 on opposite sides of the joint 16. The turret sections 17 are themselves disposed on the plates 12 in an ordered pattern of rows. As seen in FIGS. 3 and 4 the turret sections 17 are formed from the material of the plate itself with a dome or turret 18 being raised above the general plane of the plate 12 and with prongs 19 struck from the body of the plate to extend inwardly in direction opposite to the dome section. The dome 18 and the prong 19 are simultaneously formed in a metal stamping operation. At the same time a fastener opening 21 is punched. Preferably the opening 21 is provided with square sides 22. Where square sides are punched, small tabs 23 are formed on the underneath side of the dome 18 to closely engage the sides of a fastener or for other purposes. When the prongs are punched from the plate 12, a plurality of corner openings 24 are left in the plate in position about the turret 17. The corner openings 24, however, are separate one from the other, and an arch forming leg 26 of the turret section 17 is interspaced between the spaced corner openings 24. The combined construction for the separate turret sections 17 provides inwardly disposed prongs 19, a strongly reinforced turret section 17 inclusive of the arch legs 26 and the dome 18, and a depressed central opening 21 that may be of square section adapted to receive the head, shank or stem of fasteners.

As shown in FIG. 4, a carriage bolt 27 may be inserted through paired turret sections 17 of opposed plates 12 with the square shank 28 of the carriage bolt 27 closely engaged by the tabs 23 of the fastener opening 21. The typical flat undersurface of a carriage bolt head 29 closely engages a shoulder 31 on the dome segment 18 in a manner to assure efficient transmission of tension forces in the bolt to the turret section and from the turret section to the plate 12. The opposite or threaded end of the bolt 27 is provided with a nut 32 and a washer 33 which likewise efficiently transmit fastener forces to the plates 12.

Where the plates are to be applied in the field, the bolts to be used should be of a length so that the nuts may be engaged on the ends of the bolts when the prongs 19 are still disposed above the surface of timber elements 14. With this arrangement tightening of the nuts will exert compressive forces against the opposed turret sections 17 to press the prongs 19 into secure engagement with the timbers 14. When the plates are fully engaged with the flat sections 34 of the plates 12 disposed closely against the exterior surfaces 36 of the timbers 14, the plates will be held in secure and permanent position to assure proper distribution of load forces between the timber elements and the plates.

As shown in FIG. 4, the face 37 of the prongs 19 which is disposed toward the fastener opening 21 may be disposed at a slight taper with respect to the bolt 27 and its timber piercing opening 38. This disposition for the prongs 19 will assure the exertion of a compressive force in the timbers 14 directed toward the central openings 38 and the bolt fasteners 27 as the plates are moved toward full engagement with the timbers. This centrally directed compression force is in nature similar to the force exerted by compression rings of previously used timber accessories. This force application will assure better engagement between the timbers and the through fasteners in addition to providing a more secure engagement between the plate, its prongs and the timber.

Plates to be used in the construction of structural elements will usually have two or more turret sections 17. The detailed configuration of the plates, however, can be modified in accordance with the particular requirements of use. T-plates 42 or other plates of irregular shape may also be provided. The particular disposition of the turrets 17 can also be changed when it is desired to provide a plate for a particular timber joining purpose. The turret sections can be disposed in echelon, irregular and/or non-aligned positions. It is possible that special dispositions or locations can be derived to minimize any tendencies for the through fasteners to split the timbers due to possible deleterious alignment with respect to the grain of the wood. Rectangular plates of the type shown in FIG. 2, however, have proved to be highly efficient, and no undue problems have been encountered by reason of the regular patterned disposition of the turret sections 17. It is believed that the inwardly directed compressive force generated by the prongs 19 tends to minimize forces that would otherwise cause splitting of the timbers along the timber piercing openings 38.

In the use of truss plates of the foregoing type it should be noted that the fastener serves a dual purpose. First, where threaded fasteners are used, the placement and engagement of the plates 12 on the timber elements can be powered by tightening of the fasteners. Secondly, once the plates are installed, fasteners that are left in position help to hold the timbers in desired arrangement due to their through engagement or they can simply serve to hold the plates in secure engagement with the sides of the timber elements. Since most truss plates of recent design have used fasteners (or prongs) which penetrate but do not pierce the timbers being used, it has been noted that failure of truss structures or of individual truss plate joined timber elements have been preceded by withdrawl of the fasteners. Where the bolts 27 are use, the prongs 19 cannot withdraw from their engagement with the timbers. Accordingly, plates of the present type can more efficiently transmit timber loadings when the timbers or trusses are subjected to higher stress values.

While other types of fasteners may be used, carriage bolts have been illustrated and are probably preferred. The wide head of a carriage bolt assures efficient transmission of bolt loadings to the turret sections. The square shank 28 of the carriage bolts can be closely engaged by the square sides 22 of the fastener opening 21 to prevent turning of the bolt as the nut is fastened. With this arrangement the bolts may be inserted through a bottom plate that will prevent turning of the bolt, and all tightening operations can be carried on at the other surface of the timber element. It is then not necessary to hold the heads of the carriage bolts as the nuts are being tightened. Since the distance across the flats on the square shank 28 of a carriage bolt is equal to the diameter of the bolt shaft, the bolt shaft itself is closely engaged by the tabs 23 of the opposite plate 12. Where a hex nut 32 is used as shown in FIG. 4, it is desirable to use a flat washer 33, since the washer will more efficiently engage the shoulder 31 of the dome section 18. Square nuts are of larger size and the distance across the corners is sufficient to assure adequate engagement and force transmission between the nut and the turret shoulders 31 without use of a washer. A square nut is shown applied to the modified type of turret section 47 as shown in FIG. 6.

A modified form of plate 45 is partially shown in FIGS. 5 and 6. The turret sections 47 are of changed shape. Here the prongs 49 are not bent inwardly but maintain a concave curvature similar to that of the dome section 48. The central opening and square tabs 23 are of the same general configuration as previously described. As in the previous instance, the prongs 49 are still disposed at an angle of slight taper with respect to the timber piercing opening 38 so that compression forces generated in the timber will be directed toward such center opening to prevent splitting of the wood due to the presence of the through opening 38.

The plate and fastener combination used in either of the embodiments of the invention incorporate common features. The use of the timber piercing through bolts makes it possible to apply the plates in the field, since no elaborate press or other equipment is required. The plates themselves can be used as a template or drill jig to guide the drilling of the through holes 38 in the matched timbers. After the holes have been drilled a bottom plate is positioned, and the bolts are extended through the bottom plate, timber and a top plate. Where a square shank bolt is used, the plate will resist turning of the bolt as the nuts are tightened, and, accordingly, both opposed plates will be pulled into secure engagement against the timbers by tightening of the nuts. Hand or automatic tools can be used to apply and tighten the nuts so that the trusses can be readily assembled. Where electric or pneumatic drive wrenches are used, the assembly can be speedily accomplished. The speed of assembly and the low cost of plates and through fasteners makes the combination system economically attractive in addition to its greater strength capabilities. For some types of construction operations where trusses could be used, it is believed that this combination will also be advantageous inasmuch as the plates can be removed and reused. Actually truss components of temporary structures can all be disassembled and shipped in a compact package to provide a further inherent advantage.

The system not only makes it possible to remove the plates and disassemble the trusses, but it is also possible to complete a building construction in which the bolt fasteners are used merely for applying the plates. Once the prongs 19 and 49 of the plates have been pulled into secure engagement, the through fasteners or bolts could be removed, and the plates would continue to serve a purpose that is identical with presently provided plates which have formed prongs as the sole fastener element operative between a plate and timber. Further, the threaded fasteners can be removed after the plates are engaged, and rivets, rods or tie members can be reinserted to maintain the plates in the engaged position on the timbers. Any substituted fasteners should preferably extend completely through the timbers and the plates in order to develop the full advantages of the system. The use of non-piercing fasteners or of oversize nails, etc. that will engage through the fastener openings 21 is possible. Other fasteners can be used in substitution for the threaded fasteners illustrated. "Pop" or "cherry" type rivets can be engaged through the plates, and existing rivet drive guns or equipment can be used to pull the plates into secure engagement with the timbers as the rivets are set.

Use of the plates as a drill jig assures easy, accurate and efficient field installations. Actually fiield installations could be of increased strength as compared to shop fabricated assemblies for which gang drills or permanent jigs are used. In the field minor adjustments or variations can be made in the positioning of the plates to compensate for local blemishes in the wood elements.

Where the plates are to be used in the fabrication of trusses for house sized installations, the plates will be formed of approximately 18 to 20 guage metal. Where longer span trusses are to be built, the plates can be formed of heavier material without departure from the teachings of this invention. Likewise while separate embodiments of the invention have been shown and described, it is to be recognized that the invention is adaptable to various modifications and changes. All such modifications are to be considered a part of this invention.

I claim:

1. A one piece truss plate for use in joining timber elements comprising a flat base structure of sheet material providing a plurality of fastener openings disposed through said base, fasteners of length for extension completely through said plate and the timber elements being joined, a plurality of dome shaped reinforcing sections projecting from one side of said base, each of said reinforcing sections centrally containing one of said openings for the transmission of forces between said fastener and base, the outer surface of each of said reinforcing sections being defined by a convex surface terminating at the periphery of the opening therein, each of said fasteners having an enlarged portion of sufficient diameter to engage said convex surface, and prongs on said base extending therefrom in direction opposite said reinforcing sections for penetrating engagement with said timber as the plate is moved toward engagement with said timber, each of said prongs being axially aligned with at least a portion of one of said reinforcing sections, said fastener being operative to hold said base and truss plate engaged against the timber with the prongs penetrating therein to withstand loadings tending to move said timber and plate differentially.

2. Structure as set forth in claim 1 wherein a plurality of mated plates are provided for use on opposed sides of said timber elements.

3. Structure as set forth in claim 1 wherein said fastener is operative to forcibly move said plate into engaged position as the fastener is applied.

4. Structure as set forth in claim 3 wherein a threaded fastener is provided.

5. Structure as set forth in claim 1 wherein said prongs provide a surface inclined with respect to the axis of the fastener to exert a compression force in the timbers to which the plate is applied that is directed toward the fastener.

6. Structure as set forth in claim 1 wherein flat sides are provided at said fastener openings and wherein sides are provided on the shank of said fastener for cooperative non-turning engagement between said fastener opening and fastener.

References Cited
UNITED STATES PATENTS

| | | | |
|---|---|---|---|
| 409,546 | 8/1889 | Zeigler | 287—20.92 |
| 2,937,418 | 5/1960 | Sandford | 287—20.92 |
| 3,332,464 | 7/1967 | Castel | 151—38 |

FOREIGN PATENTS

| | | |
|---|---|---|
| 697,828 | 11/1964 | Canada. |
| 556,661 | 4/1923 | France. |
| 375,875 | 7/1932 | Great Britain. |
| 314,864 | 8/1956 | Switzerland. |

RAMON S. BRITTS, *Primary Examiner.*

U.S. Cl. X.R.

287—20.92